United States Patent
Park et al.

(10) Patent No.: US 12,519,091 B2
(45) Date of Patent: Jan. 6, 2026

(54) LIGHT FEEDING SYSTEM USING MICRO LIGHT-EMITTING DIODES (LEDS) LAMINATED INTO GLASS FOR LIGHT GUIDE APPLICATIONS

(71) Applicant: GM GLOBAL TECHNOLOGY OPERATIONS LLC, Detroit, MI (US)

(72) Inventors: Jonglee Park, Troy, MI (US); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 569 days.

(21) Appl. No.: 17/965,069

(22) Filed: Oct. 13, 2022

(65) Prior Publication Data

US 2024/0128242 A1    Apr. 18, 2024

(51) Int. Cl.
| | |
|---|---|
| *H01L 25/075* | (2006.01) |
| *B60K 35/21* | (2024.01) |
| *G02B 1/04* | (2006.01) |
| *G02B 27/30* | (2006.01) |
| *H10H 20/01* | (2025.01) |
| *H10H 20/855* | (2025.01) |
| *B60K 35/60* | (2024.01) |

(52) U.S. Cl.
CPC .......... *H01L 25/0753* (2013.01); *B60K 35/21* (2024.01); *G02B 1/04* (2013.01); *G02B 27/30* (2013.01); *H10H 20/01* (2025.01); *H10H 20/855* (2025.01); *B60K 35/60* (2024.01); *B60K 2360/332* (2024.01); *B60K 2360/785* (2024.01); *B60K 2360/92* (2024.01); *B60Y 2200/11* (2013.01); *H10H 20/0363* (2025.01)

(58) Field of Classification Search
CPC .. B60K 2360/332; B60K 35/00; B60K 35/60; G09F 9/33; G09F 21/04; H10H 29/142; B60Y 2200/11; G02B 27/30
USPC ............................................................. 257/79
See application file for complete search history.

(56) References Cited

U.S. PATENT DOCUMENTS

| | | | | |
|---|---|---|---|---|
| 5,510,983 | A * | 4/1996 | Lino | G02B 27/0101 701/1 |
| 2013/0121004 | A1 * | 5/2013 | Xi | G02B 19/0061 359/641 |
| 2017/0139109 | A1 * | 5/2017 | Gierens | G02B 6/0043 |
| 2020/0201043 | A1 * | 6/2020 | Sugiyama | G09F 9/00 |

(Continued)

*Primary Examiner* — Ratisha Mehta
*Assistant Examiner* — Mikka Liu
(74) *Attorney, Agent, or Firm* — CANTOR COLBURN LLP (57) ABSTRACT

Aspects of the disclosure include a light feeding system for a display that uses micro light-emitting diodes (LEDs) laminated into glass for light guide applications. An exemplary display can include a light feeding system having one or more micro LEDs on a surface of a backplane. An optical bonding collimator is positioned over and in direct contact with a surface of the micro LEDs. The optical bonding collimator is on the surface of the backplane. A light guide is coupled to an end of the optical bonding collimator such that the optical bonding collimator is between the light guide and the backplane. One or more inner reinforcing layers are in direct contact with the light feeding system and one or more outer layers are in direct contact with the inner reinforcing layers. The light feeding system is laminated with the inner reinforcing layers and the outer layers.

14 Claims, 5 Drawing Sheets

(56) References Cited

U.S. PATENT DOCUMENTS

2020/0384740 A1\* 12/2020 Berard ................... F21S 43/14
2023/0108540 A1\* 4/2023 Hirata .................. G09F 21/048
701/1

\* cited by examiner

LIGHT FEEDING SYSTEM USING MICRO LIGHT-EMITTING DIODES (LEDS) LAMINATED INTO GLASS FOR LIGHT GUIDE APPLICATIONS

INTRODUCTION

The subject disclosure relates to display technologies, and particularly to a light feeding system using micro light-emitting diodes (LEDs) laminated into glass for light guide applications.

LED-based displays generally leverage an active layer interposed between two doped layers (e.g., an n-type semiconductor layer and a p-type semiconductor layer), and the application of a voltage between the two doped layers to generate light. Voltage causes electrons to be injected into the active layer, which recombine within the active layer to release photons. When compared to traditional incandescent bulbs, LEDs can be driven at relatively low voltages while emitting lower levels of heat, providing comparatively high energy efficiencies. LEDs can be manufactured in a range of display and screen types, such as, for example, in head up displays (HUDs), in-plane displays (e.g., an in-plane communication device laminated in or on a vehicle window to communicate with users inside or outside the vehicle), smart glass, and general device displays.

Early LED-based displays were somewhat simple devices configured to display a limited variety of static images, signs, symbols, and/or messages as needed. LED technology has rapidly evolved, however, and now leverages a dense array of LEDs to drive sophisticated multipixel displays. LED based displays can be monochrome or multi-colored displays, depending on the underlying architecture, and are usually fabricated by arranging the LED(s) to feed a lightbar via a collimating optic (i.e., a collimator). Light from the lightbar is mixed (using a mixing region or homogenizing region) and ultimately displayed in a display region. LED displays configured in this manner require somewhat bulky heat management systems and the brightness of such devices can be thermally limited. Accordingly, it is desirable to provide a light feeding system that offers a higher achievable brightness at a higher thermal efficiency.

SUMMARY

In one exemplary embodiment a display can include a light feeding system having one or more micro light-emitting diodes (LEDs) on a surface of a backplane. An optical bonding collimator is positioned over and in direct contact with a surface of the micro LEDs. The optical bonding collimator is on the surface of the backplane. A light guide is coupled to an end of the optical bonding collimator such that the optical bonding collimator is between the light guide and the backplane. One or more inner reinforcing layers are in direct contact with the light feeding system and one or more outer layers are in direct contact with the inner reinforcing layers. The light feeding system is laminated with the inner reinforcing layers and the outer layers.

In addition to one or more of the features described herein, in some embodiments, the one or more micro LEDs are arranged in an array.

In some embodiments, the optical bonding collimator bonds the one or more micro LEDs to the one or more inner reinforcing layers. In some embodiments, the optical bonding collimator includes a material having a higher refractive index than a material of the one or more inner reinforcing layers.

In some embodiments, the one or more inner reinforcing layers include polyvinyl butyral (PVB) films and the optical bonding collimator includes one of clear silicon and an epoxy having a higher refractive index than that of PVB. In some embodiments, the optical bonding collimator includes a structure having dimensions selected to maximize an amount of light from the micro LEDs that contacts the one or more inner reinforcing layers at or above a critical angle required for total internal reflection (TIR) optics.

In some embodiments, the light feeding system includes a thickness in the laminate of less than 0.6 mm.

In another exemplary embodiment a vehicle includes a body having a glass panel and a light feeding system embedded in the glass panel. The light feeding system can include one or more micro LEDs on a surface of a backplane, an optical bonding collimator positioned over and in direct contact with a surface of the micro LEDs, and a light guide coupled to an end of the optical bonding collimator such that the optical bonding collimator is between the light guide and the backplane. The optical bonding collimator can be positioned on the surface of the backplane. The light feeding system is laminated in a laminate that includes one or more inner reinforcing layers and one or more outer layers of the glass panel. The one or more inner reinforcing layers are in direct contact with the light feeding system and the one or more outer layers are in direct contact with the one or more inner reinforcing layers.

In yet another exemplary embodiment a method for forming a display can include forming a light feeding system. The light feeding system can include one or more micro LEDs on a surface of a backplane, an optical bonding collimator positioned over and in direct contact with a surface of the micro LEDs, and a light guide coupled to an end of the optical bonding collimator such that the optical bonding collimator is between the light guide and the backplane. The optical bonding collimator can be formed on the surface of the backplane. The method can further include forming one or more inner reinforcing layers in direct contact with the light feeding system and forming one or more outer layers in direct contact with the one or more inner reinforcing layers. The method further includes laminating the light feeding system, the one or more inner reinforcing layers, and the one or more outer layers to define a laminate.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
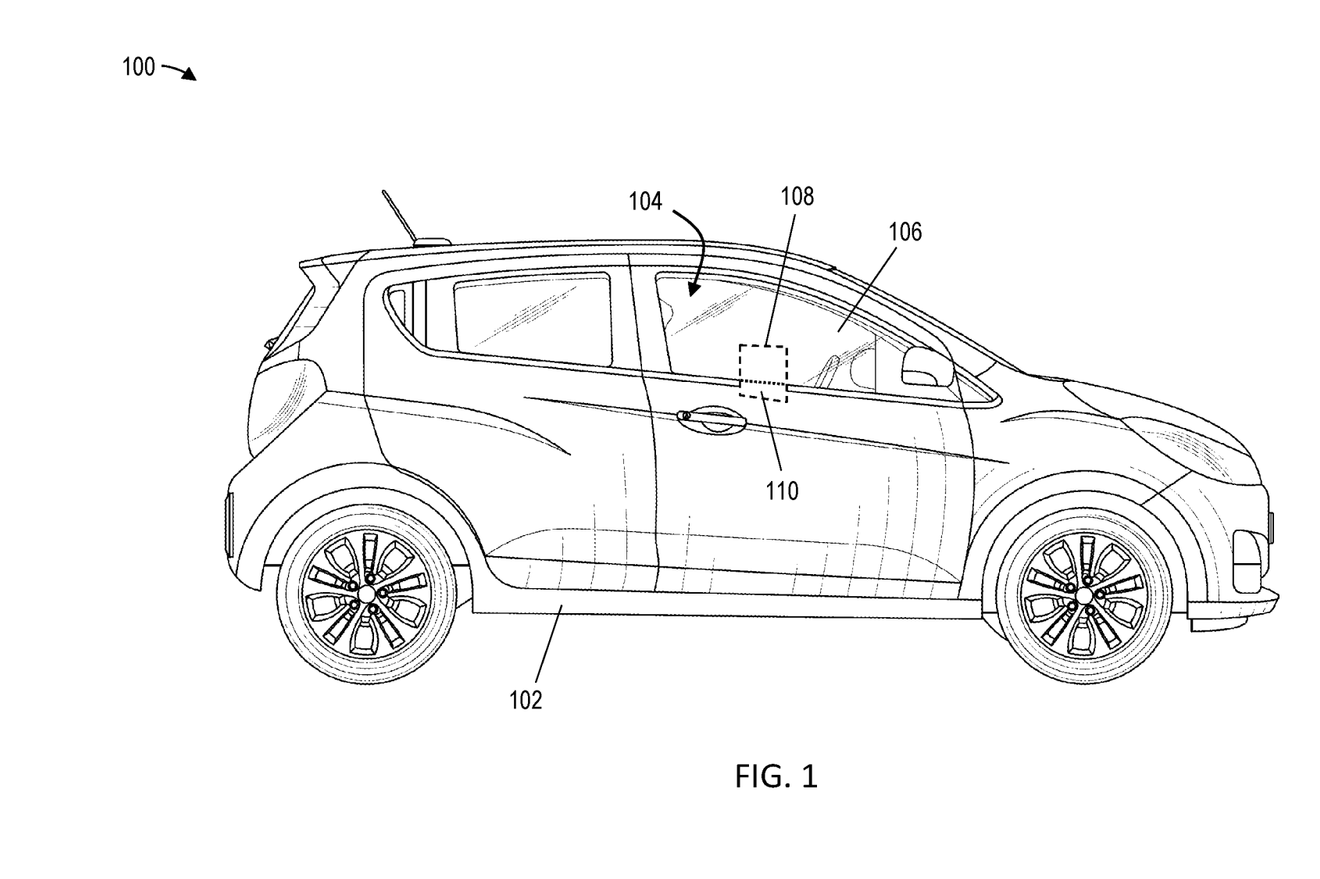
FIG. 1 is a vehicle having a display configured in accordance with one or more embodiments.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Body 102 also includes a glass panel 106. As will be detailed herein, the glass panel 106 includes a display 108 powered via an embedded high-efficiency light feeding system 202 (see FIG. 2A). The display 108 is shown in the particular glass panel 106 (i.e., the front passenger window) for ease of discussion only, and it should be understood that a display configured according to one or more embodiments can be incorporated within any glass panel of the vehicle 100 (e.g., the front windshield, driver and/or passenger windows, a sunroof, rear and side mirrors, etc.). All such configurations are within the contemplated scope of this disclosure. In some embodiments, a portion 110 of the display 108 is hidden within the body 102 (as shown).

As discussed previously, LED based displays may be fabricated by arranging the LED(s) to feed a lightbar via a collimating optic (i.e., a collimator). Light from the lightbar is mixed (using a mixing region or homogenizing region) and passed through a light guide film before ultimately exiting the light guide where a pattern is present in the film. The light exiting the pattern defines the displayed image in a display region. LED displays configured in this manner require somewhat bulky heat management systems and the brightness of such devices can be thermally limited.

This disclosure introduces a way to increase the brightness and thermal efficiency of an LED display. Rather than positioning one or more LEDs at an end of a lightbar (i.e., a single light source), displays configured according to one or more embodiments include an array of micro LEDs laminated directly into the glass layers of a glass panel. A light feeding system including the array of micro LEDs feeds light from multiple light sources (each micro LED) to a light guide film. Advantageously, a light feeding system configured in this manner does not require an optic system, improving the lighting efficiency of the display.

Micro LED displays constructed in accordance with one or more embodiments offer several technical advantages over prior LED-based displays. Resultant micro LED displays can provide a more homogeneous lighting to the light guide film by minimizing pitch between the micro LEDs. For example, a thickness of the light feeding system can be less than about 0.6 mm. Moreover, unlike conventional light guide film systems, a light feeding system configured according to one or more embodiments does not require a bulky heat management system as the driving current for each micro LED is lower than found in larger LEDs configured for lightbars. The result is a significant reduction in junction temperatures for the micro LEDs (a reduced thermal load), and consequently, the ability to drive a higher brightness without causing thermal instabilities. The light feeding system described herein also provides an opportunity for complex animation effects due to the presence of multiple light sources. For example, high resolution (limited only by micro LED pitch) animation features can be displayed on the light guide by controlling individual or arbitrarily defined groups of micro LEDs.

Figure 2A:
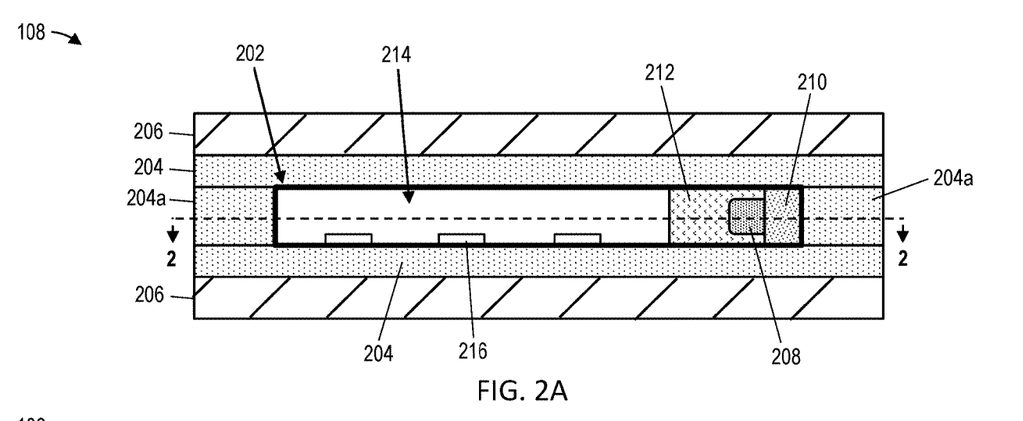
FIG. 2A is a cross-sectional view of the display shown in FIG. 1 after lamination in accordance with one or more embodiments.
Figure 2B:
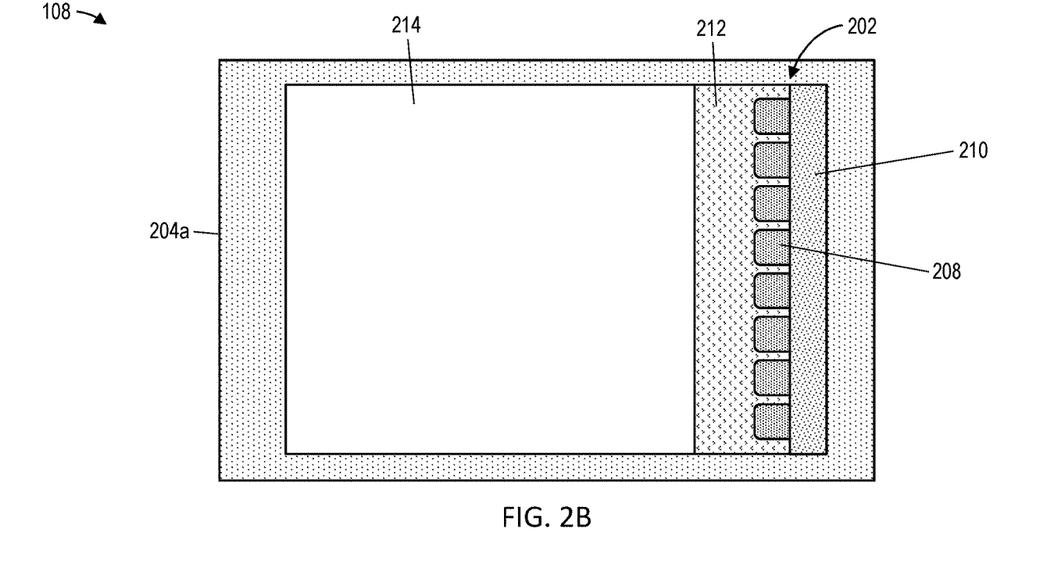
FIG. 2B illustrates a cross-sectional view of the display taken along the line "2-2" in FIG. 2A when the display is in an unilluminated state in accordance with one or more embodiments.

FIG. 2A illustrates a cross-sectional view of the display 108 shown in FIG. 1 after lamination in accordance with one or more embodiments. FIG. 2B illustrates a cross-sectional view of the display 108 taken along the line "2-2" in FIG. 2A when the display 108 is in an unilluminated state in accordance with one or more embodiments. As shown in FIGS. 2A and 2B, the display 108 includes a light feeding system 202 laminated between one or more inner reinforcing layers 204 and one or more outer layers 206. The one or more outer layers 206 can include, for example, a front glass layer and a rear glass layer of the glass panel 106 of FIG. 1.

The light feeding system 202 includes one or more micro LED(s) 208 formed on a surface of a backplane 210 (also referred to as a substrate). The display 108 is shown having a particular number (here, eight) and arrangement of micro LEDs (here, as a single array positioned on the right side of the display 108) for ease of discussion and illustration only. It should be understood, however, that the number, size, configuration, orientation, centerline-to-centerline pitch, etc., of the micro LED(s) 208 can vary as required for a given display application. As shown in FIG. 2B, in some embodiments, the micro LED(s) 208 are configured into a single N×1 array having N rows (also referred to as a linear array configuration). In other embodiments, the micro LED (s) 208 are configured into N rows and M columns to define any desired grid, bank, or linear configuration. In some embodiments, the light feeding system 202 includes two or more separate micro LED arrays. For example, two micro LED arrays can be positioned on opposite sides of the display 108.

The micro LED(s) 208 and the backplane 210 can be formed from a range of known suitable material(s), such as, for example, semiconductor materials (e.g., silicon, gallium nitride, indium gallium nitride, etc.) and sapphire, depending on the desired emission color of the respective micro LED. In some embodiments, the micro LED(s) 208 and the backplane 210 include several stacked layers, such as an indium gallium nitride/gallium nitride (InGaN/Gan) stack formed on a silicon or sapphire substrate to produce blue and green devices (not separately shown). The backplane 210 can include electrical connections (not separately shown) configured to individually control each of the micro LED(s) 208 using electrical signals (i.e., by passing a driving voltage to a respective micro LED).

In some embodiments, the light feeding system 202 further includes an optical bonding collimator 212. The optical bonding collimator 212 serves to bond or otherwise fix the micro LED(s) 208 between the one or more inner reinforcing layers 204 and/or the one or more outer layers 206.

In some embodiments, the optical bonding collimator 212 serves dual purposes: bonding and total internal reflection (TIR) optics. Total internal reflection occurs when light contacts a boundary between a first material and a second material having a lower density and refractive index than the first material at angles greater than a critical angle (i.e., the angle at which all light is reflected rather than refracted).

In some embodiments, materials for the optical bonding collimator 212 can be selected, based on materials for the one or more inner reinforcing layers 204 and/or the one or more outer layers 206, to target a specific refractive index. Specifically, in some embodiments, materials for the optical bonding collimator 212 are selected to provide a higher refractive index than the materials of the one or more inner reinforcing layers 204 and/or the one or more outer layers 206. For example, if the one or more inner reinforcing layers 204 are made of polyvinyl butyral (PVB) films, the optical bonding collimator 212 can be made of clear silicon or from epoxies having a higher refractive index than that of PVB. In some embodiments, the optical bonding collimator 212 is structured (e.g., via material selection, as described previously, as well as via physical parameter selection, such as height, width, depth) to maximize an amount of light from the micro LED(s) 208 that contacts the one or more inner reinforcing layers 204 at or above the critical angle. In this manner, all (or substantially all, e.g., 90%, 95%, 99%, etc.) light from the micro LED(s) 208 can be channeled, via the optical bonding collimator 212, to a light guide 214, with no or minimal losses through the one or more inner reinforcing layers 204. In other words, the optical bonding collimator 212 can be configured to reduce light leaking from the LED(s) 208 through the one or more inner reinforcing layers 204.

In some embodiments, the optical bonding collimator 212 is formed using transparent materials (e.g., clear resin epoxies, etc.). Transparent materials are well-suited to applications such as an in-plane display in or on glass where transparency is required or desired. Alternatively, for applications that do not require transparency (e.g., general displays), the optical bonding collimator 212 can be colored to match or otherwise complement a color of one or more of the micro LED(s) 108. The optical bonding collimator 212 can be formed to any desired thickness, such as, for example, a thickness of 10 microns to several inches.

Figure 3:
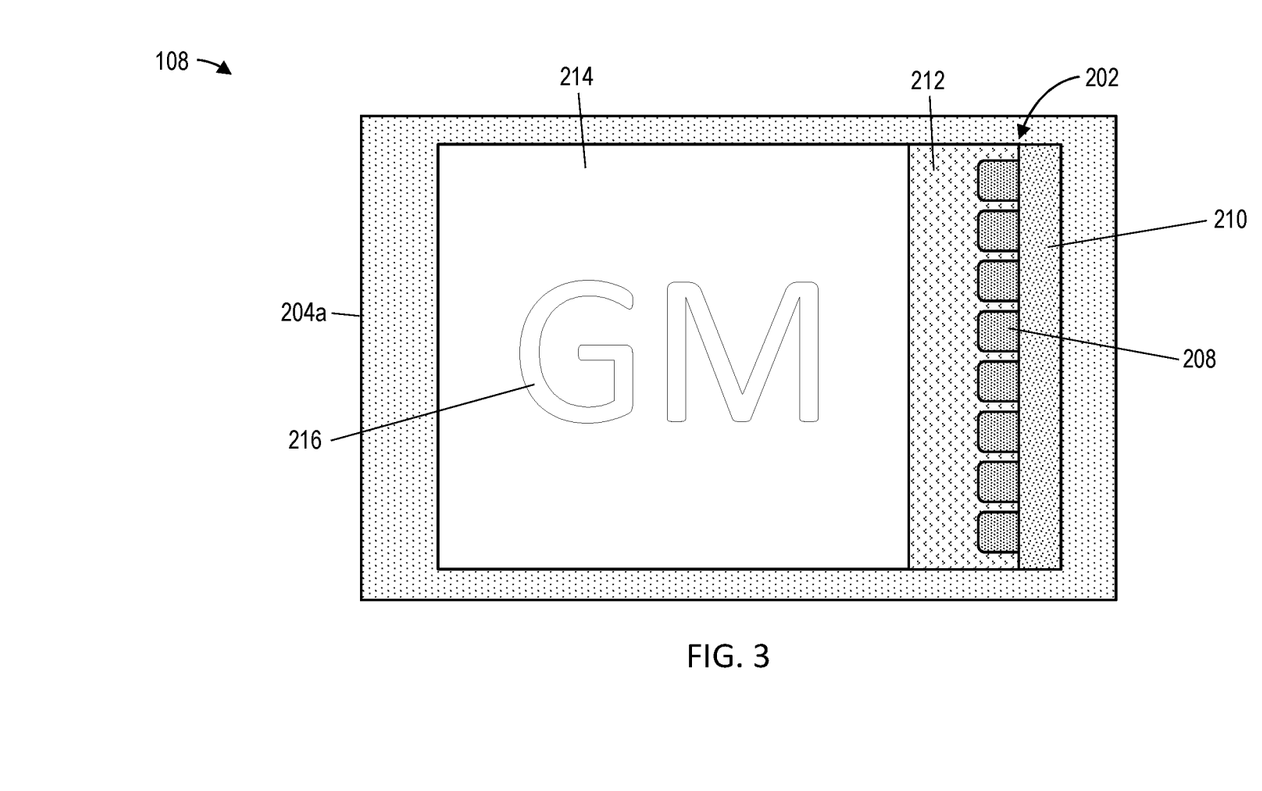
FIG. 3 illustrates the cross-sectional view of FIG. 2B when the display is in an illuminated state in accordance with one or more embodiments.

The optical bonding collimator 212 is positioned to direct light from the micro LED(s) 208 to the light guide 214. In some embodiments, the light guide 214 includes one or more transparent light guide films. In some embodiments, the light guide 214 is made of materials selected for total internal reflection, in a similar manner as described with respect to the optical bonding collimator 212. In some embodiments, the light guide 214 includes a patterned film 216 (also referred to as a micro pattern). In this configuration, light from the micro LED(s) 208 travels, via total internal reflection, through the light guide 214 and exits from the light guide 214 where the patterned film 216 is present. The shape of the patterned film 216 can be configured as desired such that light exiting from the patterned film 216 forms a desired graphic. In some embodiments, the patterned film 216 can be dynamically changed. In some embodiments, the patterned film 216 is static. While the patterned film 216 is shown arranged on a sidewall of the light guide 214 for ease of illustration and discussion, the position and configuration of the patterned film 216 is not limited to locations in or on sidewalls of the light guide 214. The patterned film 216 can be positioned on one or more of the top, bottom, sidewall, and/or even inside the light guide 214. In some embodiments, the patterned film 216 is made of a wholly or fully transparent material such that the patterned film 216 is effectively invisible when the micro LED(s) 208 are off (i.e., when the display 108 is in an unilluminated state, as shown in FIG. 2B). The desired graphic defined by the patterned film 216 will appear as soon as the micro LED(s) 208 are turned on (i.e., when the display 108 is in an illuminated state). FIG. 3 illustrates the cross-sectional view of the display 108 taken along the line "2-2" in FIG. 2A when the display 108 is in an illuminated state in accordance with one or more embodiments. As shown, the patterned film 216, when the display 108 is illuminated, defines a graphic depicting the characters "GM", although other graphics are within the contemplated scope of this disclosure.

The light feeding system 202 can be formed to any desired thickness, depending on the needs of the respective application (e.g., desired display and optical properties, etc.). In some embodiments, the light feeding system 202 can be formed to a thickness of 0.6 mm, or less than 0.6 mm (e.g., 0.4 mm, 0.2 mm, 0.1 mm, etc.), although other thicknesses are within the contemplated scope of this disclosure.

Turning now to the lamination features, the material composition of the one or more inner reinforcing layers 204 and the one or more outer layers 206 is not meant to be particularly limited and will vary depend on the needs of the respective application (e.g., desired structural, thermal, and optical properties, etc.). In some embodiments, for example, the inner reinforcing layers 204 (also referred to as optical bonding materials) can be made of PVB films and the outer layers 206 can be glass layers. PVB-glass laminates are well-suited to in-plane and smart displays and can provide a transparent or semi-transparent display as desired. In some embodiments, the one or more inner reinforcing layers 204 include a bonding layer 204a in direct contact with the light feeding system 202. In some embodiments, the bonding layer 204a is made of a same material as the one or more inner reinforcing layers 204. In some embodiments, materials for the bonding layer 204a are selected to match a transmittance and/or a color of the light guide 214. In this manner, the bonding layer 204a can visually blend in with the light guide 214.

The thickness of each of the one or more inner reinforcing layers 204 and the one or more outer layers 206 is not meant to be particularly limited and will vary depend on the needs of a respective application (e.g., desired structural, thermal, and optical properties, etc.). In some embodiments, for example, the one or more inner reinforcing layers 204 and the one or more outer layers 206 are formed to a thickness of 1 to 100 microns, or more (e.g., layers can be several inches thick if desired).

The light feeding system 202 can be laminated between the one or more inner reinforcing layers 204 and the one or more outer layers 206 using known processes. In some embodiments, the light feeding system 202, inner reinforcing layers 204 (e.g., PVB films), and outer layers 206 (e.g., glass) are heat-sealed under pressure to laminate the final structure. In some embodiments, the final structure is an in-plane display, head up display (HUD), single glass display, reflective display, etc., incorporated on or within a glass panel of a vehicle (e.g., the display 108 of FIG. 1), although other configurations, such as within a panel of a structure or device, are within the contemplated scope of this disclosure.

In some embodiments, lamination involves heating (e.g., at temperatures greater than 100 degrees Celsius) and quenching in an autoclave under a pressure of 10 kg-f/cm$^2$ or higher, although other lamination conditions (temperatures, pressures, etc.) are within the contemplated scope of this disclosure. In some embodiments, the display 108 can be formed to a total thickness of 0.1 mm to 10 mm or greater, e.g., 0.3 mm, 0.7 mm, 2 mm, an inch, several inches, etc., although other thicknesses are within the contemplated scope of this disclosure. In some embodiments, the display 108 post-lamination can have a total thickness of 0.1 mm to a thickness of several inches (e.g., 2 inches, 4 inches, etc.), depending on the application.

Figure 4:
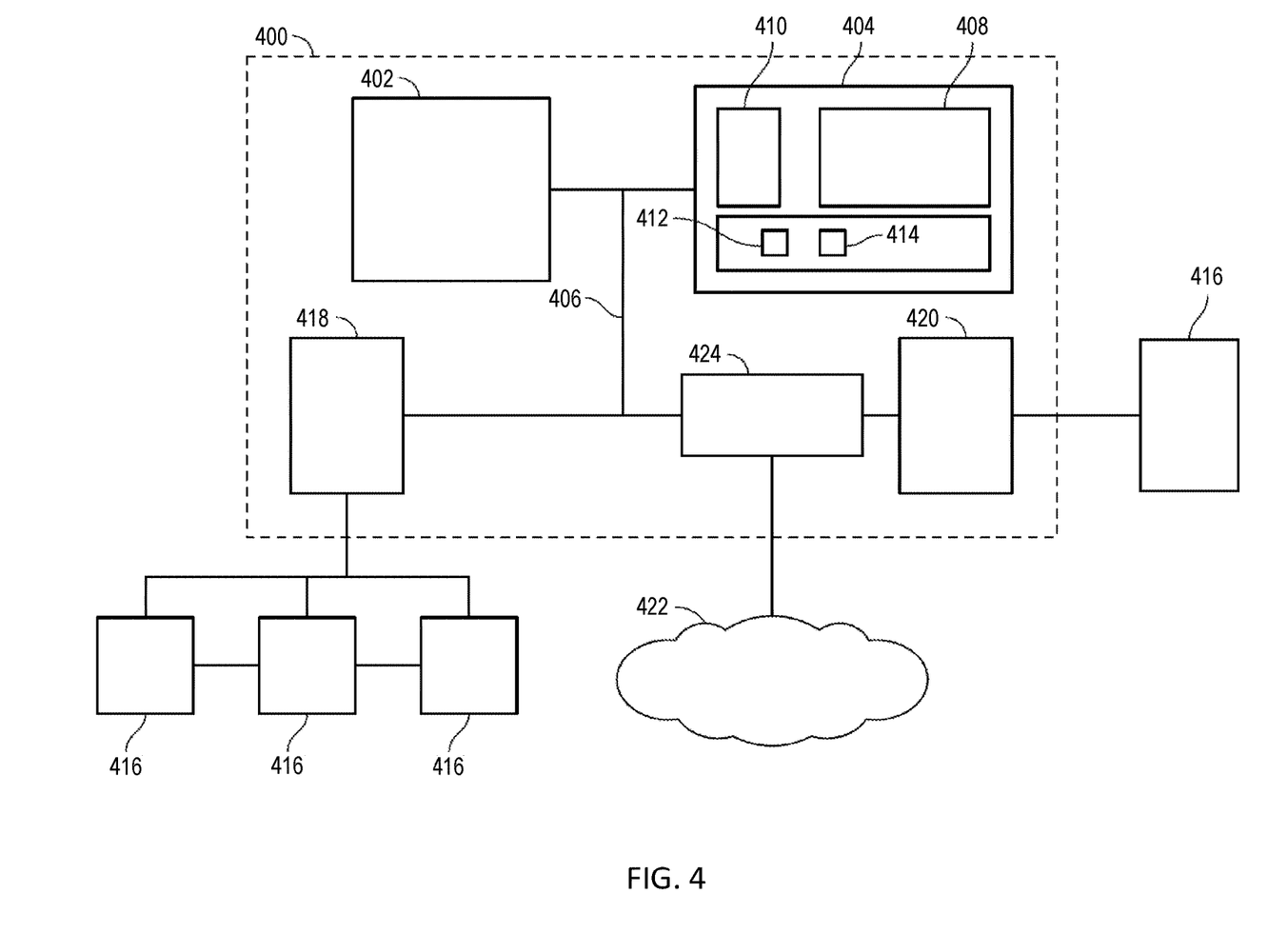
FIG. 4. is a computer system according to one or more embodiments.

FIG. 4 illustrates aspects of an embodiment of a computer system 400 that can perform various aspects of embodiments described herein. In some embodiments, the computer system 400 can be incorporated within or in combination with a micro LED display (e.g., the display 108). The computer system 400 includes at least one processing device 402, which generally includes one or more processors for performing a variety of functions, such as, for example, controlling driving voltages to one or more of the LED(s) 208 of the display 108. More specifically, the computer system 400 can include the logic necessary to direct the backplane 210 to activate or deactivate the individual LED (s) 208 or any subset of the LED(s) 208 of the display 108.

Components of the computer system 400 include the processing device 402 (such as one or more processors or processing units), a system memory 404, and a bus 406 that couples various system components including the system memory 404 to the processing device 402. The system memory 404 may include a variety of computer system readable media. Such media can be any available media that is accessible by the processing device 402, and includes both volatile and non-volatile media, and removable and non-removable media.

For example, the system memory 404 includes a non-volatile memory 408 such as a hard drive, and may also include a volatile memory 410, such as random access memory (RAM) and/or cache memory. The computer system 400 can further include other removable/non-removable, volatile/non-volatile computer system storage media.

The system memory 404 can include at least one program product having a set (e.g., at least one) of program modules that are configured to carry out functions of the embodiments described herein. For example, the system memory 404 stores various program modules that generally carry out the functions and/or methodologies of embodiments described herein. A module or modules 412, 414 may be included to perform functions related to control of the display 108, such as, for example, determining a target image based on in-vehicle data and directing the display 108 (via, e.g., the backplane 210) to drive one or more of the LED(s) 208 to create the target image. The computer system 400 is not so limited, as other modules may be included depending on the desired functionality of the respective displays. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. For example, the module(s) can be configured via software, hardware, and/or firmware to cause a display (the display 108) to display an image, such as, for example, a vehicle status or a driver and/or passenger communication.

The processing device 402 can also be configured to communicate with one or more external devices 416 such as, for example, a keyboard, a pointing device, and/or any devices (e.g., a network card, a modem, vehicle ECUs, etc.) that enable the processing device 402 to communicate with one or more other computing devices. Communication with various devices can occur via Input/Output (I/O) interfaces 418 and 420.

The processing device 402 may also communicate with one or more networks 422 such as a local area network (LAN), a general wide area network (WAN), a bus network and/or a public network (e.g., the Internet) via a network adapter 424. In some embodiments, the network adapter 424 is or includes an optical network adaptor for communication over an optical network. It should be understood that although not shown, other hardware and/or software components may be used in conjunction with the computer system 400. Examples include, but are not limited to, microcode, device drivers, redundant processing units, external disk drive arrays, RAID systems, and data archival storage systems, etc.

Figure 5:
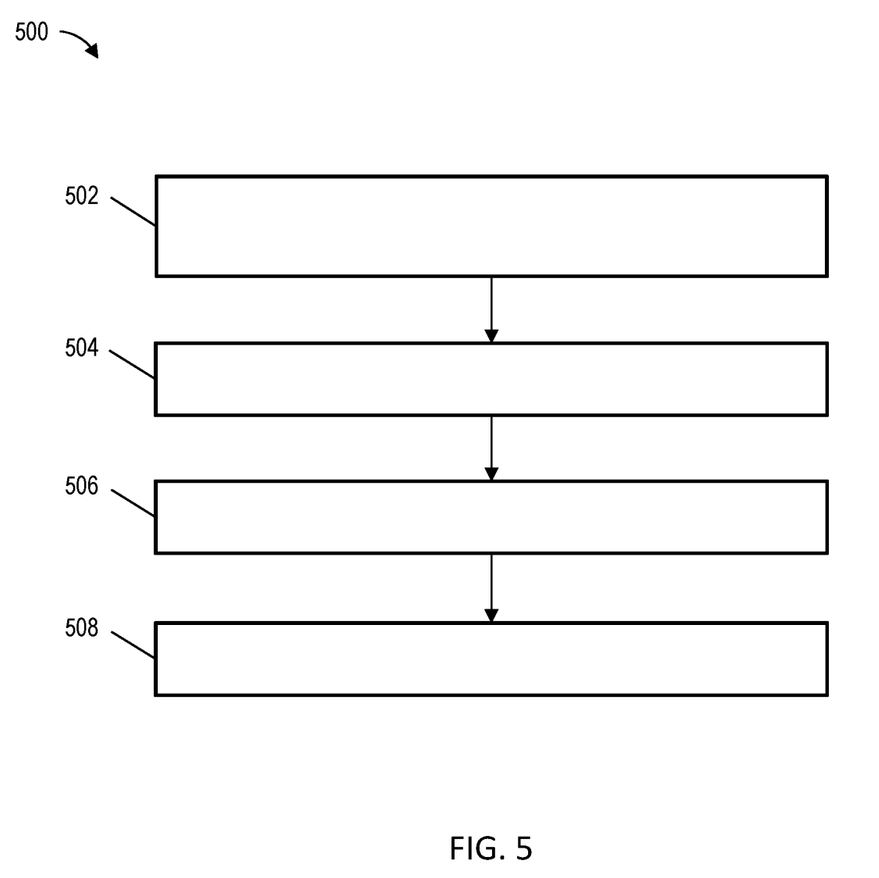
FIG. 5 is a flowchart in accordance with one or more embodiments.

Referring now to FIG. 5, a flowchart 500 for forming display 108 is generally shown according to an embodiment. The flowchart 500 is described in reference to FIGS. 1 to 4 and may include additional steps not depicted in FIG. 5. Although depicted in a particular order, the blocks depicted in FIG. 5 can be rearranged, subdivided, and/or combined.

At block 502, a light feeding system is formed. In some embodiments, the light feeding system includes one or more micro LEDs on a surface of a backplane, an optical bonding collimator positioned over and in direct contact with a surface of the micro LEDs, and a light guide coupled to an end of the optical bonding collimator such that the optical bonding collimator is between the light guide and the backplane. In some embodiments, the optical bonding collimator is positioned on the surface of the backplane.

In some embodiments, the one or more micro LEDs are arranged in an array (e.g., an N×M array). In some embodiments, the one or more micro LEDs are arranged in a linear array (e.g., an N×1 array).

At block 504, one or more inner reinforcing layers are formed in direct contact with the light feeding system. At block 506, one or more outer layers (e.g., glass) are formed in direct contact with the one or more inner reinforcing layers.

At block 508, the light feeding system is laminated with the one or more inner reinforcing layers and the one or more outer layers to define a laminate. In some embodiments, the light feeding system includes a thickness in the laminate of less than 0.6 mm.

In some embodiments, the optical bonding collimator bonds the one or more micro LEDs to the one or more inner reinforcing layers. In some embodiments, the optical bonding collimator includes a material having a higher refractive index than a material of the one or more inner reinforcing layers. In some embodiments, the one or more inner reinforcing layers include PVB films and the optical bonding collimator includes a material having a higher refractive index than that of PVB, such as clear silicon and epoxy.

In some embodiments, the optical bonding collimator includes a structure having dimensions selected to maximize an amount of light from the micro LEDs that contacts the one or more inner reinforcing layers at or above a critical angle required for TIR optics.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A display comprising:
    a light feeding system embedded in a glass panel, the light feeding system comprising:
       one or more micro light-emitting diodes (LEDs) on a surface of a backplane, the one or more micro LEDs laminated into the glass panel;
       an optical bonding collimator positioned over and in direct contact with a surface of the micro LEDs, the optical bonding collimator on the surface of the backplane; and
       a light guide coupled to an end of the optical bonding collimator such that the optical bonding collimator is between the light guide and the backplane;
    the glass panel comprising:
       one or more inner reinforcing layers in direct contact with the light feeding system; and
       one or more outer layers in direct contact with the one or more inner reinforcing layers;
    wherein the light feeding system is laminated in a laminate of the glass panel comprising the one or more inner reinforcing layers and the one or more outer layers,
    the light feeding system, the one or more inner reinforcing layers, and the one or more outer layers heat-sealed under pressure to define the laminate.

2. The display of claim 1, wherein the one or more micro LEDs are arranged in an array.

3. The display of claim 1, wherein the optical bonding collimator bonds the one or more micro LEDs to the one or more inner reinforcing layers.

4. The display of claim 1, wherein the optical bonding collimator comprises a material having a higher refractive index than a material of the one or more inner reinforcing layers.

5. The display of claim 4, wherein the one or more inner reinforcing layers comprise polyvinyl butyral (PVB) films and the optical bonding collimator comprises one of clear silicon and an epoxy having a higher refractive index than that of PVB.

6. The display of claim 5, wherein the optical bonding collimator comprises a structure having dimensions selected to maximize an amount of light from the micro LEDs that contacts the one or more inner reinforcing layers at or above a critical angle required for total internal reflection (TIR) optics.

7. The display of claim 1, wherein the light feeding system comprises a thickness in the laminate of less than 0.6 mm.

8. A vehicle comprising:
    a body comprising a glass panel; and
    a light feeding system embedded in the glass panel, the light feeding system comprising:
       one or more micro light-emitting diodes (LEDs) on a surface of a backplane, the one or more micro LEDs laminated into the glass panel;
       an optical bonding collimator positioned over and in direct contact with a surface of the micro LEDs, the optical bonding collimator on the surface of the backplane; and
       a light guide coupled to an end of the optical bonding collimator such that the optical bonding collimator is between the light guide and the backplane;
    wherein the light feeding system is laminated in a laminate comprising one or more inner reinforcing layers and one or more outer layers of the glass panel, the one or more inner reinforcing layers in direct contact with the light feeding system, and the one or more outer layers in direct contact with the one or more inner reinforcing layers,
    the light feeding system, the one or more inner reinforcing layers, and the one or more outer layers heat-sealed under pressure to define the laminate.

9. The vehicle of claim 8, wherein the one or more micro LEDs are arranged in an array.

10. The vehicle of claim 8, wherein the optical bonding collimator bonds the one or more micro LEDs to the one or more inner reinforcing layers.

11. The vehicle of claim 8, wherein the optical bonding collimator comprises a material having a higher refractive index than a material of the one or more inner reinforcing layers.

12. The vehicle of claim 11, wherein the one or more inner reinforcing layers comprise polyvinyl butyral (PVB) films and the optical bonding collimator comprises one of clear silicon and an epoxy having a higher refractive index than that of PVB.

13. The vehicle of claim 12, wherein the optical bonding collimator comprises a structure having dimensions selected to maximize an amount of light from the micro LEDs that contacts the one or more inner reinforcing layers at or above a critical angle required for total internal reflection (TIR) optics.

14. The vehicle of claim 8, wherein the light feeding system comprises a thickness in the laminate of less than 0.6 mm.

* * * * *